United States Patent [19]
Whitaker et al.

[11] 4,079,844
[45] Mar. 21, 1978

[54] AUTOMATED SYSTEM FOR LOADING WOOD GRINDERS

[75] Inventors: Glenn E. Whitaker, Ottawa, Canada; Ronald A. Makos, Cosmopolis, Wash.

[73] Assignee: Enterprises International, Inc., Aberdeen, Wash.

[21] Appl. No.: 644,529

[22] Filed: Dec. 29, 1975

[51] Int. Cl.² .............................................. B65G 57/02
[52] U.S. Cl. .................................. 214/6 H; 214/658; 221/11
[58] Field of Search .................... 214/6 D, 6 H, 6 TS, 214/8, 658, 91 R, 152; 221/11

[56] References Cited

U.S. PATENT DOCUMENTS

| | | | |
|---|---|---|---|
| 2,843,278 | 7/1958 | Qveflander | 214/6 D |
| 3,082,909 | 3/1963 | Hawkes | 221/11 |
| 3,548,895 | 12/1970 | Gentry, Jr. | 214/6 H |
| 3,727,756 | 4/1973 | Koluch et al. | 221/11 |

FOREIGN PATENT DOCUMENTS

| | | | |
|---|---|---|---|
| 233,859 | 5/1969 | U.S.S.R. | 214/658 |
| 199,754 | 9/1967 | U.S.S.R. | 214/6 H |

*Primary Examiner*—Drayton E. Hoffman
*Assistant Examiner*—Ross Weaver
*Attorney, Agent, or Firm*—Seed, Berry, Vernon & Baynham

[57] ABSTRACT

An automated system is disclosed for continuously feeding a supply a logs to the log holding magazines of one or more wood grinders on demand. A conveyor system conveys logs to a log holder which receives and forms a series of logs into a shaped charge. The shaped charge is discharged from the log holder to a loading station without change in the shape thereof. Overhead hoist-grapple carriers traveling on a monorail between the loading station and one or more wood grinding machines transfer the shaped charge from the loading station to an unloading station. Each carrier includes a grapple connected to the hoist whose arms, when closed, have an internal configuration conforming to the outer dimensions of the shaped charge. At the loading station, the grapple is lowered to pick up the shaped charge. After pickup of the load, the hoist raises the load and the carrier moves to a "ready" station. On receipt of a signal for wood from one of the wood grinders, the carrier delivers the shaped charge above the log holding magazine of a wood grinding machine and releases the shaped charge into the magazine. Sensing means are provided in each of the log holding magazines of the wood grinders which sense the level of wood therein and signal the carriers for additional wood supply when needed. A control system automatically controls movement of the carriers between the loading and unloading stations as well as controlling and unloading of the shaped log charge.

8 Claims, 3 Drawing Figures

AUTOMATED SYSTEM FOR LOADING WOOD GRINDERS

BACKGROUND OF THE INVENTION

1. Field of the Invention

This invention relates to a method and apparatus for automatically feeding a supply of logs to one or more wood grinding machines.

2. Prior Art Relating to the Disclosure

Pulp logs are sorted for feeding to wood grinders for grinding into wood fiber suitable for paper stock. The task of keeping the grinding machine supplied with logs to be ground has generally been carried out manually or semiautomatically. One semi-automatic method and means is described, for example, in U.S. Pat. No. 3,767,065. This patent discloses a system for transferring loads of logs from open-top hoppers of a loading rack by forklift vehicle while the adjacent hopper of the loading rack is being filled with logs from an infeed conveying system.

SUMMARY OF THE INVENTION

It is an object of this invention to provide an automated system for supplying shaped charges of logs to the log holding magazines of one or more wood grinders.

It is a further object of this invention to provide an automated system for collecting, aligning and transporting log charges to wood grinders on demand.

It is a further object of this invention to provide an automated system for supplying logs to wood grinders wherein a group of precut logs are (1) formed into a shaped charge, (2) aligned endwise, and (3) picked up and transported without significant change in the configuration of the shaped charge to the log holding magazine of a wood grinder on demand.

It is a further object of this invention to provide an automated system for supplying logs to wood grinders which (1) eliminates the need for a loader, (2) improves wood length control, thereby reducing jamming in the wood grinders, and (3) results in better control of log bundles.

These and other objects are accomplished with a system comprising: (1) an open-ended and open-topped log holder for receiving and forming incoming logs into a shaped charge, (2) discharge means discharging the shaped charge from the log holder to a loading station without significant change in the shape of the charge, (3) one or more overhead hoist units traveling between the loading station and one or more unloading stations above the wood grinding, and (4) grapples carried by each of the hoist units including opposed arms for picking up a shaped charge of logs at the loading station, transporting the shaped charge to an unloading station above the log holding magazines of the wood grinders and releasing the shaped charge at the unloading station, the internal surfaces of the opposed arms of the grapple approximating the outer dimensions of the shaped log charge so as not to compress the shaped charge on pickup at the loading station. Sensors in each of the log holding magazines of the wood grinders at each unloading station sense the level of wood therein and signal for more wood. A control system responsive to the receipt of a signal directs one of the overhead hoist units at the "ready" station carrying a charge of logs to the demanding station and automatically controls discharge of the charge into the magazine, return to the loading station, pickup of another charge of logs and movement from the loading station to a "ready" station where it stands until signalled by a demanding wood grinder.

DESCRIPTION OF THE PREFERRED EMBODIMENTS

Figure 1:
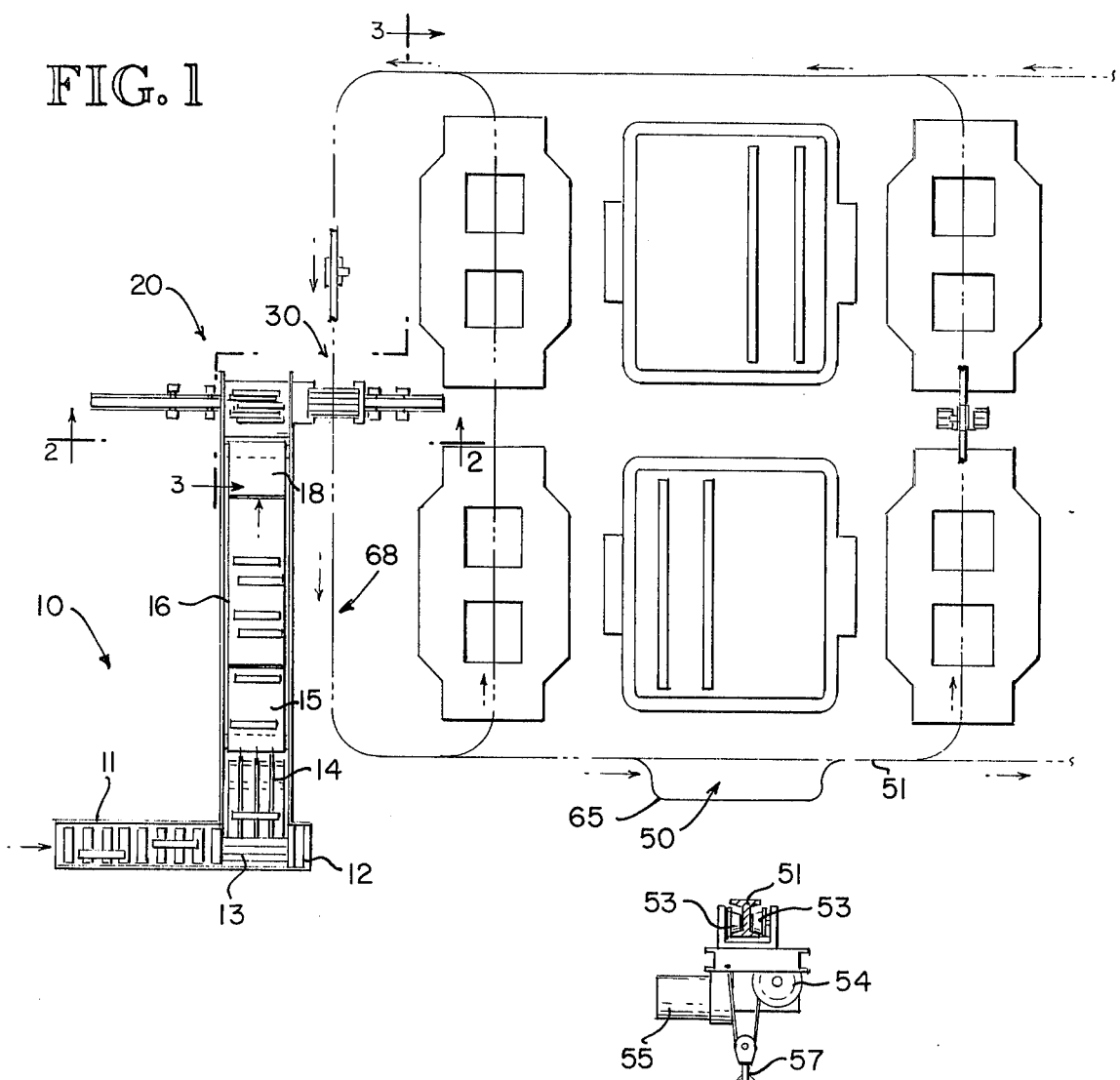
FIG. 1 is an overhead schematic of the overall system for feeding shaped charges of logs into the magazine of one or more wood grinding machines.

Referring to FIG. 1, the logs are fed to the feeding system by a series of conveyors 10 which convey, store and feed the stored supply of logs to a station 20 where the logs are formed into a shaped charge and transferred to a loading station for pickup and delivery to the magazines of one or more wood grinders by an overhead system 50. The grapple delivers the shaped charge of logs to the magazines 66 of one or more wood grinders.

The wood to be handled is generally about four feet in length and from 3 to 20 inches in diameter. The incoming logs enter on a slat conveyor 11 which discharges the wood against a cushioned backstop member 12. Each piece of wood is discharged and momentarily becomes airborne before striking the cushioned backstop member and falling into the log chute 13. The log chute assists in guiding the logs in the transverse direction as they enter the chain flights of an elevating flight conveyor 14. The elevating conveyor orients the logs so they will be carried with their axes transverse to the direction of travel of the coneyor on a belt conveyor having a width greater than the length of the logs. The elevating flight conveyor moves the logs up an incline and deposits them on the first of three in-line conveyors - receiving conveyor 15, which is about 12 feet in length. The receiving conveyor conveys the wood to a stacking conveyor 16. The stacking conveyor may vary in length up to as long as 80 feet. The conveyor has sidewalls 17 which allow the logs to pile up on the conveyor as high as four feet or more as the logs continue to travel toward the feed conveyor 18. The feed conveyor 18 is shorter in length than the stacking conveyor and reversible in direction for a reason which will be explained. All of the conveyors are powered by conventional means (not shown).

Figure 2:
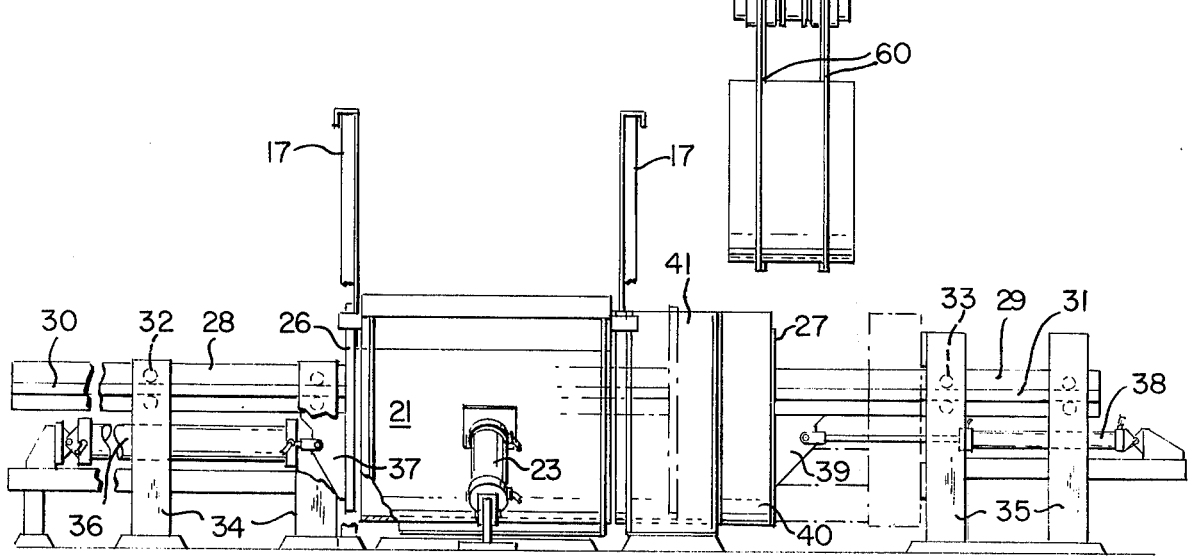
FIG. 2 is a vertical cross-sectional view along section line 2—2 of FIG. 1 illustrating the log holder and means for aligning the shaped batch of logs and transferring the shaped charge from the log holder to the loading station for pickup by an overhead gapple.
Figure 3:
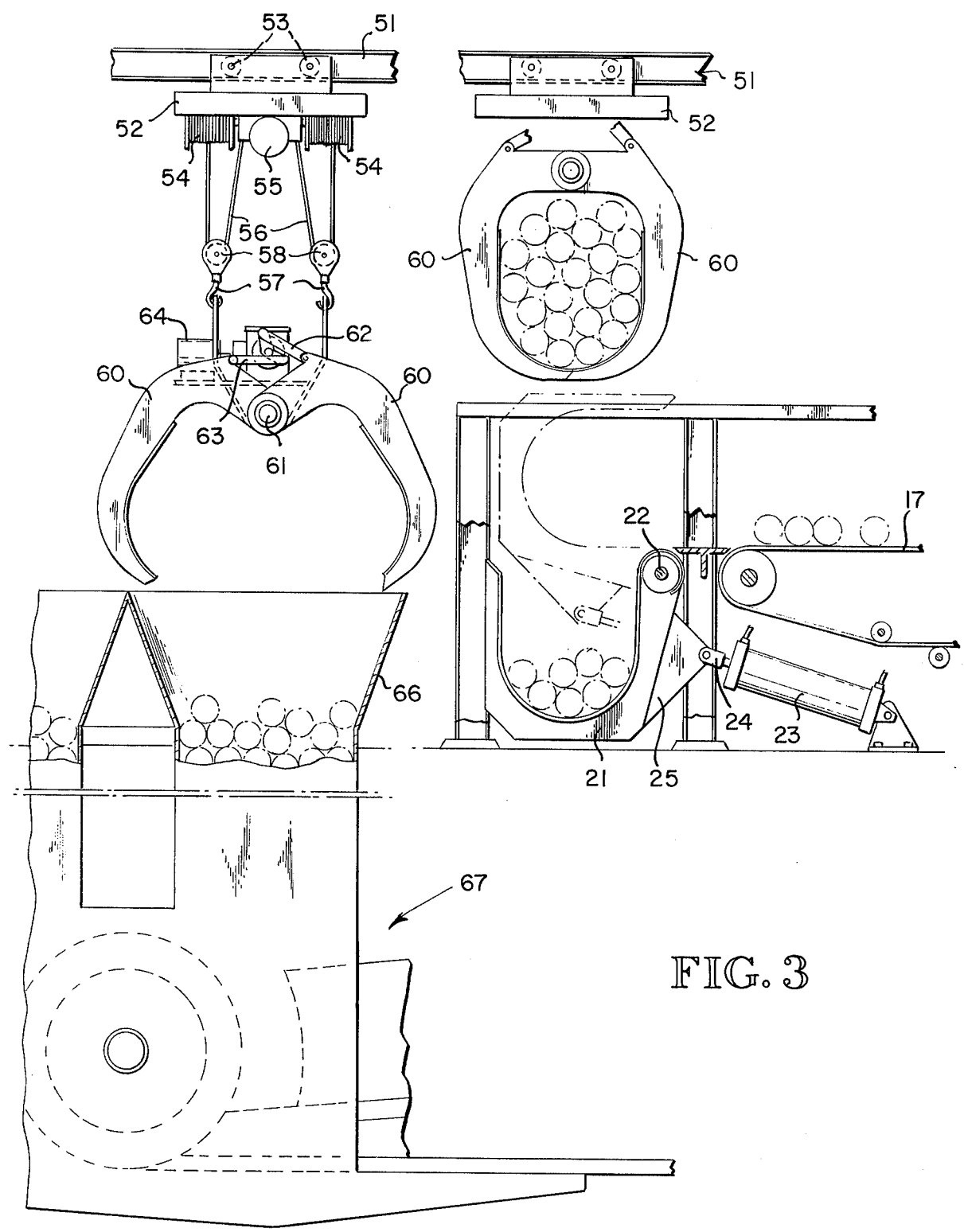
FIG. 3 is a vertical cross-sectional view along section 3—3 of FIG. 1 illustrating the log holder in its loading and transfer positions, respectively, the grapple in its loaded position and the grapple as it releases the shaped charge into the magazine of a conventional wood grinding machine.

FIGS. 2 and 3 illustrate the log holder, which receives a charge of logs from the feed conveyor and forms them into a shaped charge for transfer to a loading station. The log holder 21 is an open-topped and open-ended pocket with a U-shaped internal surface. The log holder is pivotally mounted adjacent the discharge end of the feed conveyor, as illustrated in FIG. 3, at pivot point 22 for movement between its load position shown in phantom in FIG. 3 and its transfer position shown in solid lines. The internal surface of the log holder has a rounded bottom surface so that, in the load position, logs pushed into the log holder by the feed conveyor 18 will pile up and fill the log holder. The log holder may be designed to receive any amount of logs. The holder illustrated, for example, is designed to receive one-fourth of a cord of wood, weighing about 1,000 pounds. The log holder is moved from the load position to the transfer position by a power cylinder 23 whose piston 24 is pivotally secured to a flange 25 secured to and extending from one of the sidewalls of the log holder. When the log holder receives it supply of wood in the load position, the power cylinder lowers it to the transfer position where it is topped off by logs feeding in from the feed conveyor 18. The feed conveyor 18 is reversed in direction while the shaped charge of logs in the long holder 21 is transferred to a loading station 30 at the side of and adjacent to the log holder.

Once the log holder has been loaded with a shaped charge of logs and is in the transfer position, a planar pusher platen 26 of heavy steel having a circumference the shape of the shaped log charge in the log holder transfers the shaped charge of logs to a loading station. The platen 26 pushes the shaped charge against an opposing planar pusher-receiver platen 27 adjacent the log holder to butt-align the shaped charge using the pusher-receiver platen 27 as the alignment surface. After alignment, the force exerted by pusher platen 26 overcomes the opposing force exerted by the power cylinder 38 against the pusher-receiver platen 27, allowing the shaped charge in the log holder 21 to be pushed out of the log holder into the loading station adjacent the log holder and centered beneath the monorail transfer system to be described. Transfer of the shaped charge is made without significantly altering the shape of the log charge. Guide members 28 and 29 are secured, respectively, to the rear surfaces of the pusher platen 26 and the pusher-receiver platen 27. The guide members have extending lateral flanges 30 and 31 which are guided by opposed pairs of heavy duty rollers 32 and 33, secured to supporting posts 34 and 35. Pusher platen 26 is retracted and extended by a power cylinder 36 whose piston is pivotally secured to a rear-wardly extending flange 37 secured to the rear surface of the pusher platen 26. In like manner, the receiver platen 27 is retracted and extended by power cylinder 38 whose piston is pivotally attached to a flange 39 secured to and extending from the rear surface of the platen 27. The size of the power cylinder 38 is less than that of cylinder 36, allowing the force exerted by pusher platen 26 to overcome that exerted by receiver platen 27. Receiver platen 27 has secured to its front surface a U-shaped cradle 40 whose inner shape corresponding to the inner shape of the log holder. An adjacent U-shaped cradle 41 also has this same configuration so that the shaped log charge transferred from log holder 21 to the pickup station is held by the cradles 40 and 41 in the same shape as in the log holder for pickup and transfer to the magazines of the wood grinders. Cradle 40, in retracted position (shown in phanton in FIG. 2), and cradle 41 are spaced sufficiently far apart to allow the open arms of the grapple (to be described) to close about the shaped charge and pick it up without interference. Once the shaped charge of logs is in the loading station, (1) the pusher platen 27 automatically retracts to the position shown in FIG. 2, and (2) the log holder is automatically raised to the load position to receive another charge of logs.

The shaped charge at the loading station is picked up and transferred to the magazines of the wood grinding machines by an overhead system 50 including one or more hoist-grapple carriers which ride on a monorail 51. Referring to FIG. 1, the monorail 51 extends in a closed loop between the loading station and the magazines of the wood grinders. For illustrative purposes, FIG. 1 discloses a rail system for feeding the magazines of four grinding machines. The shaped log charges are delivered to the log holding magazines by one or more carriers riding along the monorail, each including a hoist-grapple combination. Referring to FIG. 3, the hoist 52 rides along the monorail 51 supported by wheels 53. Each carrier is powered by an independent travel power supply mounted on the carrier. The travel power unit as well as the power means operating the hoist and grapple are preferably electric motors deriving their power and operation signals from the rail or rails on which the carriers travel. A pair of winch drums 54, rotatably secured to the frame of the hoist, are powered by suitable power means 55. Cables 56, wound around the respective drums 54, extend through pulleys 58. Each pulley is secured to a hook 57 for connection to the grapple.

The grapple has opposed arms 60 pivotally connected together at 61. The arms are connected by links 62 and 63 to suitable power means 64 for opening and closing of the grapple arms. In the closed position, illustrated in FIG. 3, the internal configuration of the arms of the grapple corresponds to the internal configuration of the log holder 21 and the shaped log charge so that the grapple arms, when they close about the shaped log charge, do not distort or squeeze the log charge, causing misalignment of some of the logs making up the charge.

Referring to FIG. 1, a maintenance spur 65 and spare monorail carrier may be provided for maintenance of the system. With eight wood grinding machines (total of 16 magazines), it has been found that one loading station and a total of four monorail carriers are adequate for supplying the wood grinders continuously with an adequate supply of logs for operation. In operation, the carrier centers itself over the shaped charge at the loading station with the arms of the grapple open. The grapple lowers to the "down" position, closes about the shaped log charge, raises to the "up" position, and moves to a waiting or "ready" station until signalled to deliver the shaped charge to a demanding wood grinder. When signalled, the carrier moves to a position directly above the magazine of the wood grinding machine requiring the wood. The grapple then lowers to the "down" position and opens the arms to release the log charge into the magazine 66 of the wood grinder 67. The grapple then raises to the "up" position with the arms open and returns to the loading station.

A control system, the details of which form no part of this invention, is provided to automate operation of the system. Optical sensors are installed in each of the magazines of the wood grinders to sense the level of the wood supply therein. When the wood supply is below a certain level, the sensor sends a signal signaling a carrier loaded in the "ready" station 68 adjacent the loading station to deliver a shaped charge of logs to the demanding magazine of the wood grinding machine. The carrier is programmed to travel at a speed of about 200 feet per minute. Shortly before the carrier reaches the magazine which is to receive the charge, the carrier is slowed and then stopped directly over the magazine by signal means such as derived through the rail system on which the carrier travels. The carrier is programmed to unlock and lower the grapple and the load of logs to a preset "down" position, and then open the grapple arms to release the load of logs into the magazine. The open grapple then returns to the "up" position and the carrier moves at high speed in the same direction as it approached the magazine prior to unloading. When the carrier approaches the loading station it is again slowed. Upon arriving at the loading station the carrier stops, the open grapple lowers to a preset "down" position and the grapple closes around a shaped log charge at the loading station. The closed grapple then raises to the "up" position. The carrier then moves from the loading station to the "ready" station where it will wait for a signal from a magazine needing wood.

If the "ready" station is occupied by a previous carrier, the just loaded carrier will move to a waiting station behind the "ready" station and wait there until the "ready" station is evacuated. There may be several waiting stations behind the "ready" station. There may also be one or more waiting stations ahead of the loading station.

The embodiments of the invention in which a particular property or privilege is claimed are defined as follows:

1. An automated system for supplying logs to unloading stations above the log holding magazines of one or more wood grinders, comprising:

an open-ended and open-topped log holder for receiving and forming incoming logs into a shaped charge;

means feeding logs to the log holder;

a loading station adjacent the log holder for receiving the shaped charge from the log holder without significant change in the shape of the charge;

a pusher-receiver platen at one open end of the log holder movable between first position wherein the platen serves as a surface against which to align the logs fed to the log holder and a second position adjacent the log holder supporting the shaped charge in the loading station, a pusher platen having a first position at the other open end of the log holder and a second position adjacent the loading station for initially pushing the butt ends of the shaped log charge in the log holder against the planar surface of the push-receiver platen surface for butt alignment thereof and then simultaneously (1) pushing the pusher-receiver platen to its second position and (2) transferring the butt-aligned log charge from the log holder into the loading station, power means operatively connected to the pusher platen and pusher-receiver platen for moving the pusher platen and pusher-receiver platen between their respective first and second positions;

one or more unloading stations adjacent the loading station, each unloading station including a wood grinding machine and an associated log holding magazine holding logs to be fed into the wood grinding machine;

overhead carrier means traveling between the loading station and the one or more unloading stations, the carrier means including a hoist, a grapple supported for vertical movement by the hoist, the grapple having opposed arms movable between an open position and a closed position for picking up the shaped charge at the loading station and releasing the shaped charge at the unloading station into the log holding magazine of the wood grinder, the internal configuration of the opposed arms in the closed position corresponding to the configuration of the shaped charge; and power means for operating the carrier means and grapple.

2. The system of claim 1 wherein the power means are power cylinders whose pistons are operatively connected to the pusher platen and the pusher-receiver platen, respectively.

3. The system of claim 1, including power means operatively connected to the log holder for movement between a raised load position for receiving logs and a lowered transfer position for discharge of the logs to the loading station.

4. The system of claim 1, including sensing means at each of the unloading stations sensing the need for an additional charge of logs to supply the wood grinders, and control means responsive to signals from the sensing means causing (1) movement of a carrier means whose grapple holds a shaped charge of logs picked up from the loading station from a waiting station adjacent the loading station to a point above the log holding magazine of the demanding unloading station, (2) activating the hoist of the carrier means to lower the grapple to a "down" position for release of the log charge into the log holding magazine, (3) opening of the grapple for release of the log charge, (4) activating the hoist to raise the grapple to an "up" position with the arms of the grapple open, (5) movement of the unloaded carrier means to the loading station, (6) activating the hoist thereof to lower the grapple and close the arms thereof at the loading station about a shaped log charge, (7) activating the hoist to raise the grapple and log charge, and (8) movement of the loaded carrier means to the waiting station.

5. The system of claim 3, including control means operatively connected to the power means of the pusher platen, pusher-receiver platen and log holder for sequentially (1) moving the log holder to load position to receive a charge of logs, (2) lowering the loaded log holder to transfer position, (3) activating the power means of the pusher platen to butt-align the log charge in the log holder against the pusher-receiver platen, then move the pusher-receiver platen to its second position to transfer the log charge to the loading station and then retract the pusher platen to its first position, and (4) moving the log holder to load position to receive a subsequent charge of logs.

6. An automated system for forming shaped charges of logs and transferring those shaped log charges from a loading station to one or more unloading stations spaced from loading station into the log holding magazines of one or more wood grinders, comprising:

an open-ended and open-topped log holder having an internal U-shaped pocket for receiving and forming incoming logs into a shaped charge, the log holder pivoted for movement between a raised load position wherein logs are received in the U-shaped pocket and a lowered transfer position for discharge of the logs to a loading station;

a loading station adjacent the log holder having at least one spaced log support cradle for receiving and holding the shaped charge without change in the shape thereof;

conveying means feeding logs to the log holder when in the load position;

a pusher-receiver platen at one open end of the log holder having a log supporting surface for receiving and holding the shaped log charge without change in the shape thereof movable between a first position wherein the platen serves as a surface against which to butt-align the logs in the log holder and a second position supporting the shaped log charge in the loading station;

a pusher platen having a first position at the other open end of the log holder for initially pushing the butt ends of the shaped log charge in the log holder against the planar surface of the pusher-receiver platen for butt alignment thereof and then moving the pusher-receiver platen to its second position while transferring the butt-aligned log charge from the log holder into the loading station;

power means operatively connected to the pusher platen, pusher-receiver platen and log holder for sequentially (1) moving the log holder to load position to receive a charge of logs, (2) lowering the loaded log holder to the transfer position, (3) extending the pusher platen from its first position to butt-align the log charge in the log holder against the pusher-receiver platen, transfer the aligned log charge to the loading station and retract the pusher platen to its first position, and (4) moving the log holder to load position to receive a subsequent charge of logs;

a closed loop, overhead rail extending between the loading station, a wait station adjacent the loading station, and each unloading station;

overhead carrier means traveling on the rail between the loading station, waiting station and each unloading station, each carrier means including an overhead hoist extending from the rail, a grapple supported for vertical movement from the overhead hoist, the grapple including opposed arms movable between an open position and a closed position for picking up the shaped charge at the loading station, the arms of the grapple having an inner configuration, when in the closed position, corresponding to the configuration of the shaped charge and power means for moving the carrier means along the rail, and for operating the grapple;

sensing means at each of the unloading stations sensing the need for an additional charge of logs to supply the wood grinder; and control means responsive to signals received from the sensing means causing (1) movement of a carrier means holding a shaped charge of logs from the waiting station adjacent the loading station to a point above the log holding magazine of the demanding unloading station, (2) activating of the hoist of the carrier means to lower the grapple thereof to a "down" position for release of the log charge into the log holding magazine, (3) opening of the grapple for release of the log charge into the log holding magazine, (4) activating the hoist to raise the grapple to an "up" position with the arms of the grapple open, (5) movement of the unloaded carrier means to the loading station, (6) activating the hoist to lower the grapple and close the arms thereof at the loading station about the shaped log charge, (7) activating the hoist to raise the grapple and log charge means to the waiting station.

7. The method of claim 6, including sensing the log supply in the magazine of a wood grinder and signaling a loaded carrier means for delivery of a charge of logs thereto.

8. An automated method for supplying logs between a loading station and unloading stations directly above the log holding magazines of one or more wood grinders on demand, comprising:

forming a batch of logs into a shaped charge in a forming station, discharging the shaped charge to a loading station without changing the shape of the charge during the transition from the forming station to the loading station, providing one or more carriers which travel in one direction in an endless loop between the loading station and one or more of the unloading stations, removing the shaped charge from the loading station to a carrier without change in the shape of the shaped charge, moving the loaded carrier from the loading station to a waiting station adjacent the loading station, sensing the log supply held in the log holding magazines of the wood grinders and signaling the loaded carrier when the log supply falls below a predetermined level in one of the log holding magazines, moving the loaded carrier, on receipt of a signal from the log holding magazine, from the waiting station to the unloading station above the log holding magazine signaling the need for an additional log supply, releasing the shaped charge from the carrier into the magazine at the unloading station, and returning the unloaded carrier to the loading station for picking up an additional charge of logs.

* * * * *